United States Patent
Golob et al.

(10) Patent No.: US 10,481,943 B2
(45) Date of Patent: Nov. 19, 2019

(54) SYSTEM AND METHOD FOR STATE MACHINE MANAGEMENT

(71) Applicant: Winmore, Inc., San Francisco, CA (US)

(72) Inventors: John Golob, San Francisco, CA (US); Troy Goode, San Francisco, CA (US); Joshua Yanovski, Rockville, MD (US)

(73) Assignee: Winmore, Inc., San Francisco, CA (US)

( * ) Notice: Subject to any disclaimer, the term of this patent is extended or adjusted under 35 U.S.C. 154(b) by 21 days.

(21) Appl. No.: 15/858,155

(22) Filed: Dec. 29, 2017

(65) Prior Publication Data

US 2018/0189096 A1    Jul. 5, 2018

Related U.S. Application Data

(60) Provisional application No. 62/441,133, filed on Dec. 30, 2016.

(51) Int. Cl.
  *G06F 9/46*    (2006.01)
  *G06F 9/54*    (2006.01)
  *G06F 9/48*    (2006.01)

(52) U.S. Cl.
  CPC ............ *G06F 9/466* (2013.01); *G06F 9/4843* (2013.01); *G06F 9/542* (2013.01)

(58) Field of Classification Search
  CPC ......... G06F 9/466; G06F 9/4843; G06F 9/542
  See application file for complete search history.

(56) References Cited

U.S. PATENT DOCUMENTS

| | | | | |
|---|---|---|---|---|
| 6,138,118 A * | 10/2000 | Koppstein | ............... | G06F 9/466 |
| 7,178,055 B2 * | 2/2007 | Ji | ........................ | G06F 11/2064 711/162 |
| 7,219,260 B1 * | 5/2007 | de Forest | ............ | G06F 11/1474 714/15 |
| 7,464,301 B1 * | 12/2008 | Entezari | .............. | G06F 11/3476 714/45 |
| 8,180,922 B2 * | 5/2012 | Dini | ..................... | G06F 11/008 709/225 |
| 8,255,460 B2 * | 8/2012 | Reistad | .................. | G06Q 30/02 709/203 |
| 8,260,816 B1 * | 9/2012 | Vaghani | .............. | G06F 16/1774 707/791 |
| 8,886,995 B1 * | 11/2014 | Pallapothu | .......... | G06F 11/1471 714/15 |

(Continued)

*Primary Examiner* — Adam Lee
(74) *Attorney, Agent, or Firm* — Haynes and Boone LLP (57) ABSTRACT

A system and method of state machine management includes loading a state machine. The state machine includes states, transitions between respective pairs of the states, and tasks for each of the state transitions. Each of the tasks represents a precondition before a corresponding state transition may occur and is identified by a task identifier and a version. The method further includes identifying a current state, providing a status of a first task associated with an outgoing state transition from the current state to an agent, receiving an update to the status of the first task, and recording the update to the status of the first task as a first task event. The task is identified by a first task identifier and a first version. The first task event records the first task identifier, the first version, a first time stamp of when the update occurred, and the agent.

20 Claims, 4 Drawing Sheets

```
TaskEvent {
  StateMachineID;
  TaskID;
  Version;
  TimeStamp;
  Agent;
  SchemaID;
};
```
310

```
TransitionEvent {
  StateMachineID;
  FromState;
  ToState;
  TimeStamp;
  Agent;
};
```
320

(56) References Cited

U.S. PATENT DOCUMENTS

| | | | |
|---|---|---|---|
| 9,201,591 B1* | 12/2015 | Wardle | G06F 3/0488 |
| 9,557,983 B1* | 1/2017 | Chan | G06F 8/61 |
| 9,569,255 B1* | 2/2017 | Johnson | G06F 9/4887 |
| 2003/0050789 A1* | 3/2003 | Hasson | G06Q 10/0637 |
| | | | 705/30 |
| 2005/0021708 A1* | 1/2005 | Raghuraman | G06Q 10/10 |
| | | | 709/223 |
| 2007/0169075 A1* | 7/2007 | Lill | G06F 8/61 |
| | | | 717/168 |
| 2008/0168106 A1* | 7/2008 | Freedman | G06F 16/27 |
| 2008/0250118 A1* | 10/2008 | Ray | H04B 7/18582 |
| | | | 709/219 |
| 2009/0292720 A1* | 11/2009 | De Peuter | G06F 16/9024 |
| 2010/0031263 A1* | 2/2010 | Lamothe | G06Q 10/06 |
| | | | 718/102 |
| 2010/0319005 A1* | 12/2010 | Erignac | G06F 9/52 |
| | | | 719/315 |
| 2011/0010720 A1* | 1/2011 | Smith | G06F 21/00 |
| | | | 718/102 |
| 2012/0151272 A1* | 6/2012 | Behrendt | G06F 9/542 |
| | | | 714/39 |
| 2012/0159091 A1* | 6/2012 | Li | G06F 11/3612 |
| | | | 711/154 |
| 2014/0071135 A1* | 3/2014 | Morsi | G06Q 10/10 |
| | | | 345/440 |
| 2016/0042023 A1* | 2/2016 | Leach | G06F 9/466 |
| | | | 707/703 |
| 2016/0162343 A1* | 6/2016 | Fitzpatrick | G06F 9/4498 |
| | | | 719/318 |
| 2016/0352566 A1* | 12/2016 | Mekkattuparamban | H04L 41/0672 |
| 2016/0373349 A1* | 12/2016 | Porat | H04L 45/38 |
| 2017/0206464 A1* | 7/2017 | Clayton | G06N 3/0454 |
| 2017/0255668 A1* | 9/2017 | Schnell | G06F 16/2343 |

* cited by examiner

SYSTEM AND METHOD FOR STATE MACHINE MANAGEMENT

TECHNICAL FIELD

This application claims priority to U.S. Provisional Application 62/441,113, entitled "System and Method for State Machine Management" and filed on Dec. 30, 2016, which is incorporated herein by reference in its entirety.

TECHNICAL FIELD

The present disclosure relates generally to computing systems, and more particularly to the management of state machines.

BACKGROUND

Modern computing systems are often called upon to manage and coordinate complex processes such as control systems, manufacturing processes, logistics processes, and/or the like. Many of these complex processes can be modeled using a state machine approach where the processes move from state to state based on defined transition conditions and events that govern when and if a state transition should take place. When the state machines governing these processes are relatively static (i.e., the arrangement and conditions applicable to the states and state transitions do not change much or at all over time), the management and tracking of state machines is often relatively straight forward by keeping a simple log of state transitions as they occur. However, when the rules governing a complex process are subject to frequent change and/or revision such that the arrangement of the states and/or the state transitions have to be redefined, the management and tracking of the state machines becomes increasingly more complex. For example, when the conditions that govern a transition between two states is changed, it is no longer helpful to trace or audit a previous transition between the two states against the new state transition as the current set of conditions that govern the state transition will likely not agree with the previous set of conditions used to cause the previously recorded state transition. This makes the tracing and auditing of state transitions for previous versions of the state machine very difficult to achieve.

Accordingly, it would be advantageous to improve state machine models and state machine tracking to support tracing and auditing of the state machines even though the states or state transitions in the state machine change over time.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

According to some embodiments a method performed by a state machine engine operating on a server includes loading an instance of a state machine. The state machine includes a plurality of states, one or more state transitions between respective pairs of the states, and one or more tasks for each of the one or more state transitions. Each of the one or more tasks represents a precondition before a corresponding state transition may occur and is identified by a respective combination of a task identifier and a version. The method further includes identifying a current state from among the plurality of states of the instance of the state machine, providing a status of a first task associated with an outgoing state transition from the current state to an agent, receiving an update to the status of the first task, and recording the update to the status of the first task as a first task event. The task is identified by a first task identifier and a first version. The first task event records the first task identifier, the first version, a first time stamp of when the update occurred, and the agent.

According to some embodiments a non-transitory machine-readable medium including a plurality of machine-readable instructions which when executed by one or more processors associated with a server cause the processors to perform a method. The method includes loading an instance of a state machine. The state machine includes a plurality of states, one or more state transitions between respective pairs of the states, and one or more tasks for each of the one or more state transitions. Each of the one or more tasks represents a precondition before a corresponding state transition may occur and is identified by a respective combination of a task identifier and a version. The method further includes identifying a current state from among the plurality of states of the instance of the state machine, providing a status of a first task associated with an outgoing state transition from the current state to an agent, receiving an update to the status of the first task, and recording the update to the status of the first task as a first task event. The task is identified by a first task identifier and a first version. The first task event records the first task identifier, the first version, a first time stamp of when the update occurred, and the agent.

According to some embodiments a computing system includes a memory for storing a state machine repository and one or more processors coupled to the memory. The state machine repository stores one or more state machine objects describing structures of a state machine. The structures include a plurality of states, one or more state transitions between respective pairs of the states, and one or more tasks for each of the one or more state transitions. Each of the one or more tasks represents a precondition before a corresponding state transition may occur and is identified by a respective combination of a task identifier and a version. The state machine repository further stores one or more task events describing respective updates to one of the one or more tasks. Each of the one or more task events includes a respective task identifier, a respective version, a respective time stamp of when a corresponding update occurred, and a respective agent responsible for the corresponding update. The one or more processors configured to execute instructions to cause the computing system to load an instance of a state machine, identify a current state from among the plurality of states of the instance of the state machine, provide a status of a first task associated with an outgoing state transition from the current state to an agent, receive an update to the status of the first task, and record the update to the status of the first task as a first task event in the memory. The task is identified by a first task identifier and a first version. The first task event records the first task identifier, the first version, a first time stamp of when the update occurred, and the agent.

According to some embodiments, the systems and methods of state machine tracking described herein may be usable to model, track, trace, and audit state machines used to monitor complex processes, such as those employed by control systems, manufacturing processes, logistics processes, and/or the like. The systems and methods are further usable to effectively and efficiently trace and/or audit both currently and previously tracked instances of the processes even though the underlying state machine models for the processes have changed over time.

Figure 1:
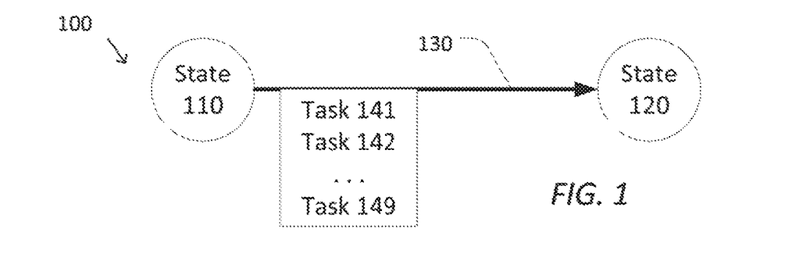
FIG. 1 is a simplified diagram of a state machine according to some embodiments.

FIG. 1 is a simplified diagram of a state machine 100 according to some embodiments. As shown in FIG. 1, state machine 100 includes a state 110 and a state 120. Each of state 110 and/or state 120 may correspond to various stages and/or checkpoints in a complex process as is described in further detail below. Although not shown, each of state 110 and/or state 120 may be associated with one or state variables and/or other metadata that may further characterize the respective state 110 and/or state 120. Also shown in FIG. 1 is a state transition 130 between state 110 and state 120. State transition 130 is depicted as a directed arrow indicating that state transition 130 describes a state transition from state 110 (e.g., the starting or from state) to state 120 (e.g., the ending or to state). State transition 130 further includes several tasks 141-149 that describe the preconditions to be satisfied before state transition 130 may be used to transition state machine 100 from state 110 to state 120. Each of the tasks 141-149 may represent a respective action that should take place, a condition that should be met, data that should be gathered, and/or the like before state transition 130 may be used to transition state machine 100 to state 120. And although only two states 110 and 120 and one state transition 130 are depicted in FIG. 1, it is understood that state machine 100 may include any number of (e.g., 3, 4, 5, or more) states as well any number (e.g., 2, 3, or more) of state transitions between the various states. Additionally, state transition 130 may include any appropriate number (e.g., 1, 2, 3, 4, or more) of tasks usable to describe the conditions, actions, and/or the like that should be satisfied to allow state transition 130 to take place.

According to some embodiments, state machines modeled like state machine 100 are usable to model various types of complex processes. In some embodiments, a state machine may be usable to model a control system, such as a furnace control system. Each of the states in the state machine may correspond to various operating states of the furnace including states corresponding to fan off and burner off; fan on and burner off; fan on, igniter lit, and gas off; fan on, igniter lit, and gas on; and/or the like. Each of the state transitions may correspond to transitions between the states subject to one or more tasks. For example, the state transition from fan on, igniter lit, and gas off to fan on, igniter lit, and gas on may depend on a first task to determine whether the igniter has reached a threshold minimum temperature (e.g., so that it can effectively ignite the gas), a second task to determine whether there is sufficient gas pressure, and/or the like.

In some embodiments, a state machine may be usable to model a manufacturing process, such as one found on an assembly line or in a semiconductor fabrication facility. Each of the states in the state machine may correspond to various work stations or work substations where various manufacturing steps (e.g., tasks) should take place. For example, suitable tasks may correspond to attachment of a part, heating to a specific temperature for a specific period of time, treatment with a chemical for a specific period of time, and/or the like.

In some embodiments, a state machine may be usable to model a logistics process, such as one found to support expediting of a shipment. Each of the states in the state machine may correspond to various planning stages for the shipment and/or actual shipping steps or stages as the shipment is handled. For example, suitable planning tasks may correspond to identifying a shipper for one or more legs of the shipment that can meet various delivery, cost, and/or other considerations and suitable shipping tasks may correspond to scanning and/or tracking of the shipment as it arrives at different locations, is transferred between different shippers, is delivered at the destination, and/or the like.

Figure 2:
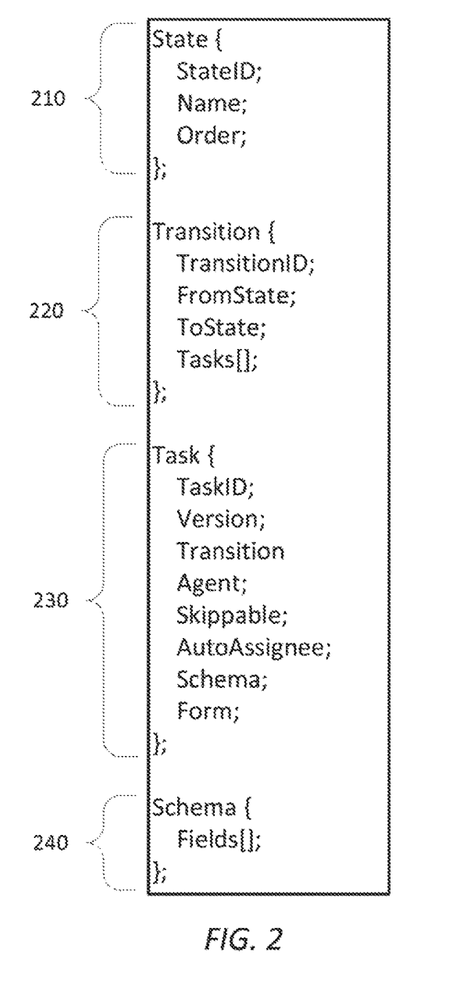
FIG. 2 is a simplified diagram of object descriptions for objects usable to model a state machine according to some embodiments.

FIG. 2 is a simplified diagram of object descriptions for objects usable to model a state machine according to some embodiments. Each of the object descriptions is depicted in FIG. 2 using a programming language like notation (e.g., similar to C structs, C++ or java objects, and/or the like) suitable to show the various object types and the various fields of each of the object types. However, it is understood that, in practice, these object descriptions may be easily adapted to other storage and definition paradigms such as database tables, markup schemas (e.g., eXtensible Markup Language (XML), Simple Object Access Protocol (SOAP), etc.), and/or the like. It is further understood that even though the types of the various fields are not shown in FIG. 2, suitable data types may be selected based on the medium used to implement the objects and the purposes of the fields. As shown, the object descriptions in FIG. 2 include the fields that are useful for describing state machines where the structure and/or arrangement of the state machines may be altered over time. In addition, the object descriptions may include additional fields that are not shown, including fields for recording useful data and metadata, such as creation/modification dates, access control lists, primary and foreign key constraints when database tables are used, and/or the like.

A State object description 210 is used to describe the various states in a state machine and could, for example, be used to model states 110 and/or 120. A StateID field is used to identify each respective state and may be encoded using an unsigned integer or other suitable data type. In some examples, the StateID values may be globally unique or locally unique within each state machine and/or state machine repository (e.g., a collection of state machines for a particular user, organization, tenant, and/or the like). In some examples, the states described by state object description 210 may be indexed by the StateID field. In some examples, when the states are stored in a database, the StateID field may be suitable as a primary key for the State table. An optional Name field is used, for example, as a display name when the corresponding state is represented in a report, user interface, and/or the like. An optional Order field is used to provide an indicator of state ordering between different states within a state machine. The Order field may be implemented using any data type that supports at least partial ordering and/or a full ordering (e.g. any numeric type).

A Transition object description 220 is used to describe the various state transitions in a state diagram and could, for example, be used to model state transition 130. A TransitionID field is used to identify each respective state transition and may be encoded in a similar fashion to the StateID field with the TransitionID being usable to index the state transitions and/or the like. A FromState field and a ToState field identify the starting and ending states, respectively for the state transition and may be encoded, for example, to store respective StateID values. In the examples of FIG. 1, the FromState and ToState values for state transition 130 would correspond to states 110 and 120, respectively. Transition object description 220 further includes a collection of tasks in a Tasks field. The collection of tasks may correspond to any suitable collection (e.g., an array, vector, etc.) that can support storage or identification of one or more tasks that represent the conditions that determine whether the corresponding state transition may be used to cause a state transition within a corresponding state machine.

A Task object description 230 is used to describe the various tasks that are the preconditions for the state transitions in a state machine and could, for example, be used to model tasks 141-149. A TaskID field is used to identify each respective task and may be encoded in a similar fashion to the StateID and TransitionID fields with the TaskID being usable as at least a partial index to the tasks and/or the like. A Version field is used to track the various versions of the tasks identified by the TaskID. Thus, the Version field is usable to keep track of the different versions of the tasks as they are created, edited, modified, etc. This further allows the tracking and managing system to differentiate between different task completion and state transitions as the state machine and the rules governing the state transitions changes as is discussed in further detail below. In some examples, the Version field may further contribute to the index for the tasks. In some examples, each combination of TaskID and Version is unique. In some examples, the TaskID and Version fields may alternatively be combined together to form a compound field to index and/or uniquely identify the tasks. A Transition field is used to identify the state transition to which the task is associated. In some examples, the Transition field may be encoded to store respective TransitionID values. An Agent field identifies the agent to which the corresponding task is assigned. The Agent field may include an identifier that identifies a corresponding user, system, and/or the like that is responsible for satisfying the conditions of the task. In some examples, the Agent field may alternatively refer to a group of agents and/or include an array, vector, and/or other collection of agents. A Skippable field is a Boolean field that identifies whether the corresponding task is optional any may be skipped when considering whether the associated state transition may take place. An optional AutoAssignee field identifies the agent that is to be automatically assigned to the task when an instance of that task is created, such as when a state change occurs and the task is associated with an outgoing state transition from the new state. A Schema field identifies a schema that includes the data associated with the task as is discussed in further detail below. A Form field identifies a user interface component (e.g., a dialog) that can be used to present and/or edit the data associated with the corresponding Schema. Although not discussed in further detail, the Form may include a graphical layout that includes text boxes, radio buttons, select boxes, sliders, and/or other user interface widgets that allow a user to visualize and/or edit the corresponding data values in the Schema. According to some embodiments and for the sake of improved simplicity in modeling, tasks may be associated with a single agent so that state transitions that involve input from multiple agents should have separate tasks defined for each of the multiple agents. According to some embodiments, the order in which tasks are addressed and closed is not limited so that tasks which are to be completed in a constrained order should be separated across a sequence of ordered states and state transitions.

A Schema object description 240 is used to describe the data associated with the state and/or state machine that is associated with a task. A Fields field includes a collection of fields that represent the data that is to be manipulated during the completion of a task. The fields may correspond to numeric values (such as a recorded temperature, pressure, price and/or the like), strings (such as a comment field, a serial number, a part number, and/or the like), and/or other data values that may be relevant to the state machine or a particular state in the state machine. In some examples, each of the fields may be designated as required or optional depending upon whether their completion is required before the task can be completed. In some examples, one or more of the fields may be defined with a default initial value. And although not expressly shown, each of the data fields may also have one or more validations that govern possible values for the data in the corresponding field. For example, a numeric field may include a validation to ensure that any recorded data value is within an acceptable range, a string field may include a validation to ensure that any recorded string conforms to a pattern (such as a (xxx) xxx-xxxx pattern for a phone number, yyyyy-yyy for a zip code, and/or the like), and/or the like. In some examples, one or more complex validations may additionally and/or alternatively used where values of one data field may depend on values of one or more other data fields.

It should be understood that the embodiments of FIG. 2 are representative only and other arrangements and/or structures for the object descriptions are possible. According to some embodiments, one or more additional object descriptions may be used. In some examples, a StateMachine object description may be used to describe each of the different types of state machines. Each state machine object may include fields for keeping track of a collection of states, a collection of state transitions, a collection of tasks, and/or the like. Each state machine object may further include one or more of a schema to identify the data fields associated with the state machine, a tenant or entity to which the state machine is associated, a collection of agents allowed to create instances of the state machine, a collection of agents allowed to complete tasks and/or perform state transitions, and/or the like. In some examples, each state machine may further include fields that identify a default start state and/or one or more ending states for the state machine; although the start and one or more ending states may alternatively be inferred using the ordering associated with the Order field of the various states that are part of the state machine.

According to some embodiments, different arrangements of the object descriptions are possible. In some examples, the individual schemas for each of the tasks may alternatively be replaced by a single schema for the state machine with each of the task objects referencing respective forms that access a subset of the fields in the single schema.

Figure 3:
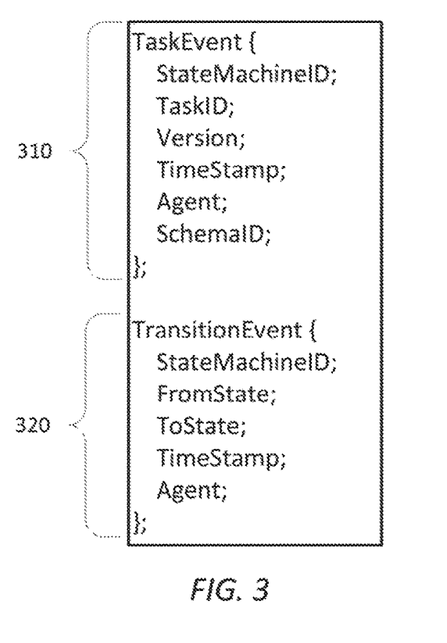
FIG. 3 is a simplified diagram of object descriptions for objects usable to track and manage instances of a state machine according to some embodiments.

FIG. 3 is a simplified diagram of object descriptions for objects usable to track and manage instances of a state machine according to some embodiments. Similar to FIG. 2, each of the object descriptions is depicted in FIG. 3 using a programming language like notation suitable to show the various object types and the various fields of each of the object types. However, it is understood that, in practice, these object descriptions may be easily adapted to other storage and definition paradigms. It is further understood that even though the types of the various fields are not shown in FIG. 3, suitable data types may be selected based on the medium used to implement the objects and the purposes of the fields. As shown, the object descriptions in FIG. 2 include the fields that are useful for tracking and/or auditing instances of state machines implemented using the object descriptions of FIG. 2 where the structure and/or arrangement of the state machines may be altered over time. In addition, the object descriptions may include additional fields that are not shown including fields for recording useful data and metadata, such as creation/modification dates, access control lists, primary and foreign key constraints when database tables are used, and/or the like.

A TaskEvent object description 310 is used to describe updates made to a task, such as one of the tasks described using the Task object description 230. The TaskEvent object description 310 includes a StateMachineID field that is used to identify the instance of the state machine for which the task completion is being recorded. A TaskID field and a Version field that are used to refer to the corresponding version of the task that is being recorded as a task completion event. Similar to the Task object description 230, the Task ID and Version fields may alternatively be combined into a single field. A TimeStamp field is used to record the date and time when the TaskEvent is recorded (e.g., when the corresponding task is updated and/or completed). The TimeStamp field may be encoded using any suitable date-time format, such as the Unix time format. An Agent field is used to record the identity the agent responsible for updating the task and may refer to the user, system, and/or the like that directed the state machine engine to update the task. An optional SchemaID field is used to identify an instance of a schema (e.g., an instance of the schema identified in the Schema field of the corresponding task object) that may be used to record a copy of the data fields at the time the TaskEvent is recorded, so that the state of each of the data fields may be reviewed and audited as is discussed in further detail below.

It should be appreciated that the recording of both the TaskID and Version with the TaskEvent provides an improved ability for the state machine engine to trace and/or audit the completion of tasks and correspondingly the state transitions of an instance of the state machine. This is possible because by not only recording when a task was completed, but also which version of the task was completed, the state machine engine is able to efficiently access the correct schema and form that corresponds to the version of the task that was applied and completed at the time of the recorded TaskEvent. This makes the tracing and auditing more robust as it is not tied to the current version of the state machine and facilitates the tracing and auditing of the state machine as it was at the time of the task completion. This is described in further detail below.

A TransitionEvent object description 320 is used to describe the state transitions between actual states in an instance of a state machine. The TransitionEvent object description 320 includes a StateMachineID field that is used to identify the instance of the state machine for which the transition event is being recorded. A FromState field and a ToState field identify the starting and ending states, respectively for the recorded state transition and may be encoded, for example, to store respective StateID values. A TimeStamp field is used to record when the state transition took place, and an Agent field is used to record the Agent that performed the state transition. In some embodiments, an additional TransitionID field may also be included to record the corresponding state transition for which the transition event is being recorded.

As is described in further detail below, recorded instances of the TaskEvent and the TransitionEvent provide suitable information to support both tracing and auditing of instances of corresponding state machines even though the underlying definition of the state machines (e.g., the arrangement of states and state transitions, the tasks that are the preconditions for a state transition, and/or the like) may be changing over time.

Figure 4:
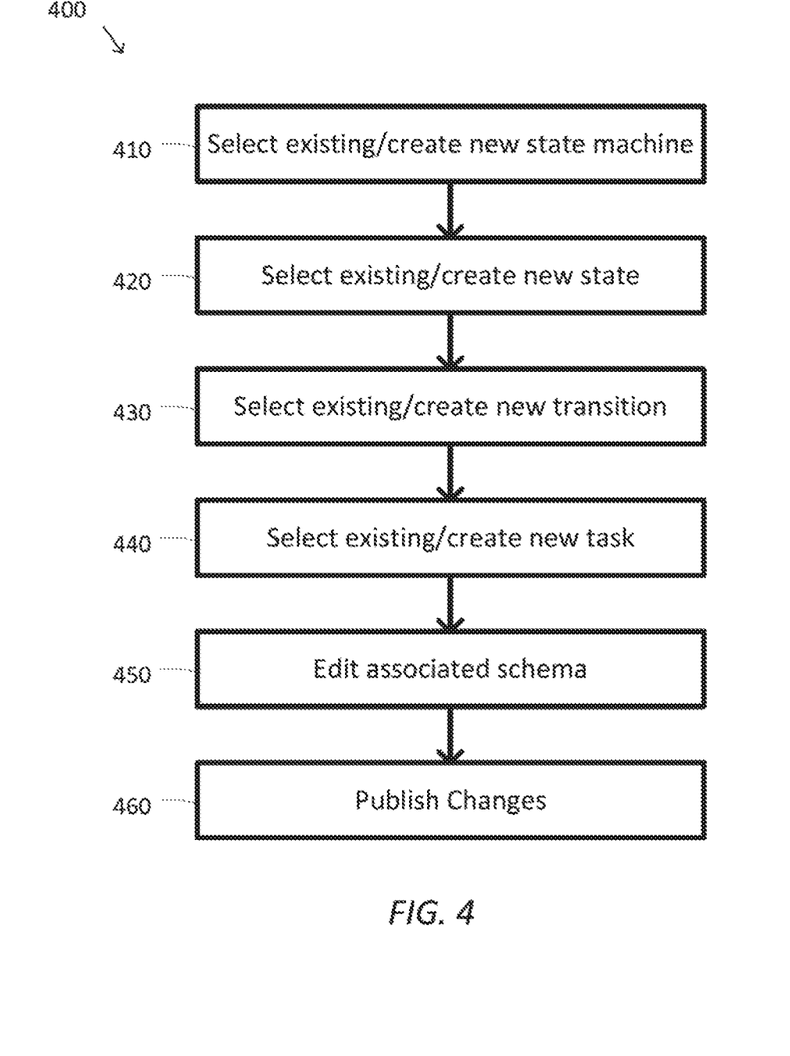
FIG. 4 is a simplified diagram of a method of creating and/or editing a state machine according to some embodiments.

FIG. 4 is a simplified diagram of a method 400 of creating and/or editing a state machine according to some embodiments. One or more of the processes 410-460 of method 400 may be implemented, at least in part, in the form of executable code stored on non-transitory, tangible, machine readable media that when run by one or more processors may cause the one or more processors to perform one or more of the processes 410-460. For example, method 400 may be implemented by a state machine engine. And although FIG. 4 implies an apparent ordering to the processes of method 400, no such strict ordering is required as agents may move around between the various create, select, and edit processes during the creation and/or editing of a state machine as is well understood in the art. And although processes 410-460 of method 400 are generally described below as if they are being performed by a user as an agent via, for example, a graphical user interface, each of the processes 410-460 may be alternatively performed by other agents (e.g., automated systems and/or applications) via an application programming interface (API) call to the state machine engine, such as through a function call, activation of one or more links or controls (e.g., a button) on a web page, remote procedure call, web service, and/or the like.

At a process 410, an existing state machine is selected or a new state machine is created. Editing of a state machine begins with the selection of a state machine to be edited. In some examples, the state machine to be edited may be selected from a list of existing state machines or alternatively by creating a new one. In some examples, a dashboard or other integrated design environment (e.g., a creation studio) may present the user with a list of existing state machines (e.g., in a dialog box, drop down list, and/or the like) and allow the user to either select a state machine from the list or create a new state machine. In some embodiments, as part of creating or selecting the state machine, the user may also be provided with one or more dialogs for creating and/or manipulating the data fields associated with state machine and to be recorded in a corresponding schema. In some examples, the creation and/or manipulation of these fields may include selecting, adding, or deleting data fields; naming or renaming the data fields; selecting a type for the data fields; defining range and/or other validation constraints for the data fields, and/or the like. As the state machine is created and/or its fields are edited, a corresponding instance of a state machine definition record is created and stored and/or is updated.

At a process 420, an existing state from the state machine is selected or a new state is created. Similar to process 410, the user may be presented with a list of states and/or a graphical depiction of the state machine (similar to FIG. 1) from which the user may select an existing state or choose to create a new state. Values for the various state fields are then entered and/or edited through a suitable dialog. In some examples, a state name is entered and/or edited for the Name field and optionally an order for the state is entered and/or edited for the Order field. In some embodiments, process 420 may further include an ability to rearrange the state machine by changing an order of the state machine by moving states and/or state transitions between the states. In some examples, this can be performed using a drag and drop interface. As the state is created and/or its fields are edited, a corresponding instance of a state definition record (is created and stored and/or is updated.

At a process 430, an existing state transition from the state machine is selected or a new state transition is created. Similar to process 420, the user may be presented with a list of state transitions and/or a graphical depiction of the state machine (similar to FIG. 1) from which the user may select an existing state transition or choose to create a new state transition. Values for the various state transitions fields are then entered and/or edited through a suitable dialog and/or drag and drop interface, such as by dragging between two existing states when a new state transition tool is being used and/or by clicking on an existing state transition. If not inherently specified by the drag and drop interface, values for the FromState and ToState fields may then be entered and/or edited. As the state transition is created and/or its fields are edited, a corresponding instance of a state transition definition record (e.g., consistent with Transition object definition 220) is created and stored and/or is updated.

At a process 440, an existing task from a state transition is selected or a new task is added to a state transition. Similar to process 430, the user may be presented with a list of tasks associated with the state transition selected and/or created during process 430 and/or a graphical depiction of the tasks in the various state transitions may be displayed (similar to FIG. 1) from which the user may select an existing task or choose to add a new task to the corresponding state transition. Values for the various task fields are then entered and/or edited through a suitable dialog. In the examples of FIG. 2, the user may be prompted to enter and/or edit values for one or more of the Agent field (e.g., by picking from a list of known agents), the Skippable field (e.g., the selecting or unselecting a check box), and the AutoAssignee field (e.g., by picking form a list of know agents). One or more of the TaskID, Version, Transition, Schema, or Form fields may be automatically assigned by the dashboard, design environment, creation studio, and/or API. In some examples, when a new task is created, it is assigned a new TaskID value and a Version number of 1 and when an existing task is edited, its Version number is updated to the next available version number. In some embodiments, the ordering of the tasks within a state transition may be changed, such as by dragging them to different positions within the corresponding task list.

At a process 450, an associated schema for the task created or selected during process 440 is edited. When a task already has an associated schema and corresponding form the associated schema may be loaded and displayed to the user using the corresponding form. In some examples, when the state machine is associated with processes to be driven by other systems (e.g., to support a control system, an automated manufacturing process, and/or the like), the user may be provided with a list of possible data fields, such as those data fields specified during process 410, from which the user may select which fields are to be included with the task. In some examples, when the state machine is associated with processes to be driven, at least in part, by users (e.g., to support an non-fully automated manufacturing process, a logistics process, and/or the like), the user may be provided with a form editing tool that allows the user to select, edit, drag, drop, and/or the like various data fields onto the corresponding form working from the list of possible data fields for the state machine.

At a process 460, the changes are published. Because the state machine engine is designed to keep track of the versions of the state machines (and especially the tasks), changes to the tasks, schemas, and/or forms are not finalized until published by the user to avoid creating multiple versions of the tasks that will never be used during operation of a corresponding instance of a state machine. The effects of publishing depend on the type of entity being published. A new task is added as an instance of a task definition record (e.g., consistent with Task object description 230) and a modification to an existing task creates an updated instance of the previous task definition record with an updated value for the Version field. For each of the created and/or edited schemas and forms, new instances of corresponding schema and form definition objects are created and saved.

Processes 410-460 may then be repeated in any suitable order to create new state machines and/or edit existing state machines.

Figure 5:
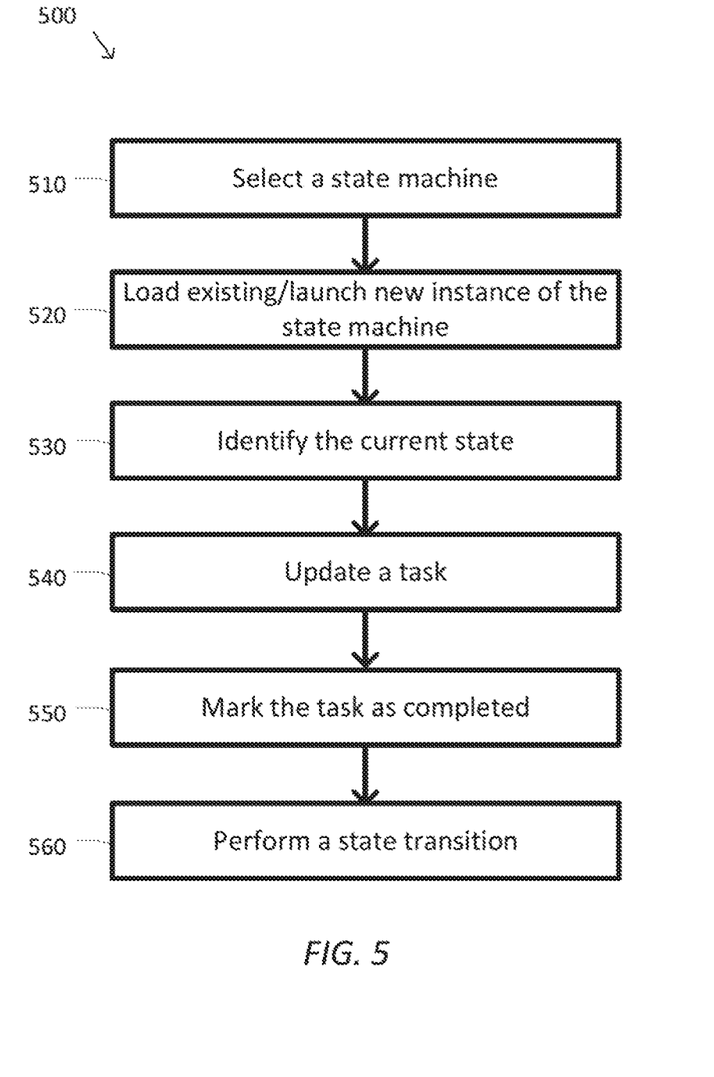
FIG. 5 is a simplified diagram of a method of using an instance of a state machine to track a process according to some embodiments.

FIG. 5 is a simplified diagram of a method 500 of using an instance of a state machine to track a process according to some embodiments. One or more of the processes 510-560 of method 500 may be implemented, at least in part, in the form of executable code stored on non-transitory, tangible, machine readable media that when run by one or more processors may cause the one or more processors to perform one or more of the processes 510-560. For example, method 500 may be implemented by a state machine engine. And although FIG. 5 implies an apparent ordering to the processes of method 500, no such strict ordering is required as agents may move around between the various select and update processes as each instance of a state machine is updated to move among the tasks, state transitions, and/or states. In some embodiments, process 550 is optional and may be omitted. And although processes 510-560 of method 500 are generally described below as if they are being performed by a user as an agent via, for example, a graphical user interface, each of the processes 510-560 may be alternatively performed by other agents (e.g., automated systems and/or applications) via an API call to the state machine engine.

At a process 510, a state machine is selected. In some examples, the state machine may be selected from a list of existing state machines or alternatively by requesting a state machine by name that matches a Name record in one of the state machine object records. In some examples, a dashboard or other user interface may present the user with a list of existing state machines (e.g., in a dialog box, drop down list, and/or the like) and allow the user to select a state machine from the list.

At a process 520, an existing instance of the state machine selected during process 510 is loaded or a new instance of the state machine selected during process 510 is created. Because each of the state machines created and/or editing by method 400 may be applied to multiple processes, a separate instance with separate state tracking is used for each. This allows, for example, the status of multiple control systems, separate manufactured items, separate logistics processes, and/or the like to be separately tracked and/or monitored. When an existing state machine instance is selected, information about its current state, status of tasks, data fields, etc. is loaded from a repository of instances of existing state machine and state machine related objects. When a new instance of a state machine is requested, the new instance is created. In some examples, creation of a new instance of the state machine includes creating the instance of a state machine object, determining a starting state for the state machine instance and creating an instance of the starting state, identifying the one or more transitions for which the starting state is a from state and creating instances of those transition objects, identifying the one or more tasks for each of the one or more state transitions and creating instances of those tasks, identifying each of the one or more schemas associated with the state machine and/or the one or more tasks and creating instances of those schemas, and/or creating instances of the data fields included in the one or more schemas and initializing the values of the data fields where appropriate. In some examples, as each of the instances of the tasks is created and/or initialized, a corresponding TaskEvent is created and saved using a process described in further detail below with respect to process 540. In some examples, an identifier for the selected state machine is identified.

At a process 530, the current state of the instance of the state machine selected during process 520 is identified. In some examples, when the instance of the state machine is created during process 520 the current state is the default starting state of the state machine or alternatively may be selected from among the possible states by the agent using the instance of the state machine. When instances of the transitions and their associated tasks, etc. are not yet created, these instances are created upon the selection of the current state. In some examples, when the instance of the state machine previously existed, the current state may be identified by finding the most recent (e.g., using the TimeStamp field) instance of a TransitionEvent that matches the identifier of the instance of the state machine and referencing the ToState field.

At a process 540, one of the tasks associated with the one or more transitions from the current state identified during process 540 are updated. In some examples, the status (e.g., the data values recorded for each of the data fields in a respective instance of the schema associated with the instance of the task) of the instance of the task may be reviewed by the agent utilizing method 500. In some examples, the status of the instance of the task may be identified by loading the TaskEvent associated with the instance of the task with a most recent TimeStamp field. In some examples, the status may be displayed to the agent (e.g., a user) on a user interface using the form associated with the task. In some examples, the status may be requested via an API call that may provide a collection of one or more data fields and corresponding one or more data field values. One or more of the data fields associated with the task may then be updated by entering new values using the form and saving the changes or alternatively through an appropriate API call. In some examples, a task may be updated by assigning it to an agent or a group of agents.

According to some embodiments, how the task is updated may depend on the underlying process the instance of the state machine is being asked to monitor and/or track. In some examples, when the state machine is associated with a control system, an update to the task may include recording a process variable (e.g., a temperature or pressure), noting a change in a control variable, and/or the like. In some examples, when the state machine is associated with a manufacturing process, an update to the task may include recording the completion of a process step (e.g., an etching step, a deposition step, attachment of a new part, etc.), identifying a part or serial number of a part added to an assembly, and/or the like. In some examples, when the state machine is associated with a logistics process, an update to the task may include recording the determination of project variables (e.g., a quoted price, an estimated delivery, an identification of a shipper, etc.), recording of a selection of a vendor, and/or the like.

In some examples, each time the instance of the task is updated an instance of a TaskEvent is created and saved to provide tracking of the instance of the state machine at a later time. In some examples, the instance of the TaskEvent is consistent with the TaskEvent object description 310 and includes the identity of the task (both task and version), the agent, a time stamp, and a schema instance being recorded. In some examples, process 540 may then be repeated to make additional updates to the task and/or to make one or more updates to other tasks.

At an optional process 550, the task is marked as completed. A task may be marked as completed when all of the required data fields have been updated by process 540 and each of the data fields satisfies any validations defined for the data fields. In some examples, the task may be automatically marked as completed by the state machine engine when the required data fields are updated and the validations are satisfied. In some examples, the task is only marked as completed when the agent using the instance of the state machine requests that the task be marked as complete, the required data fields are updated, and the validations are satisfied. In some examples, when the state machine engine determines that the task may be may be marked as completed, the state machine engine may activate an interface control (e.g., a completion button) and/or provide a task completable status flag to the agent. In some examples, marking a task as completed may be restricted to a limited number of agents (e.g., a supervisory user). When the task is formally marked as completed, an instance of a corresponding Task Event is recorded.

At a process 560, a state transition is performed. Once all of the required (i.e., non-skippable tasks) for a state transition are completed, the state transition may be used to transition the instance of the state machine to a next state. The next state may be identified using the ToState field in the Transition object corresponding to a current instance of a transition. In some examples, the state transition may be automatically performed by the state machine engine when each of the non-skippable tasks associated with the state transition may be marked as completed and/or are marked as completed. In some examples, the state transition is performed when the agent using the instance of the state machine requests that the state transition be performed and each of the non-skippable tasks associated with the state transition may be marked as completed and/or are marked as completed. In some examples, when the state machine engine determines that the state transition may be performed, the state machine engine may activate an interface control (e.g., a state transition button) and/or provide a state transition possible status flag to the agent. In some examples, performance of a state transition may be restricted to a limited number of agents (e.g., a supervisory user). The new state for the instance of the state machine is identified using the ToState field of the state transition object. In some examples, a state transition may be performed by undoing a previous state transition, which would result in a state transition where the roles of the FromState and ToState fields would be reversed.

When the state transition is performed, an instance of a TransitionEvent is recorded. In some examples, the instance of the TransitionEvent is consistent with the TransitionEvent object description 320 and includes the identity of the starting and ending states of the state transition, the agent, a time stamp, and a schema instance being recorded. In some examples, when a skippable task is not completed and the state transition is performed an instance of a TaskEvent instance may be created and recorded indicating that the corresponding task was skipped. Upon completion of the state transition, an instance of the new state is created as well as instances of each of the state transitions whose FromState field corresponds to the new state, instances of each of the tasks associated with each of the state transitions, and instances of corresponding schemas.

Processes 510-560 may then be repeated in any suitable order to select instances of other state machines, update additional tasks, and/or perform additional state transitions.

Figure 6:
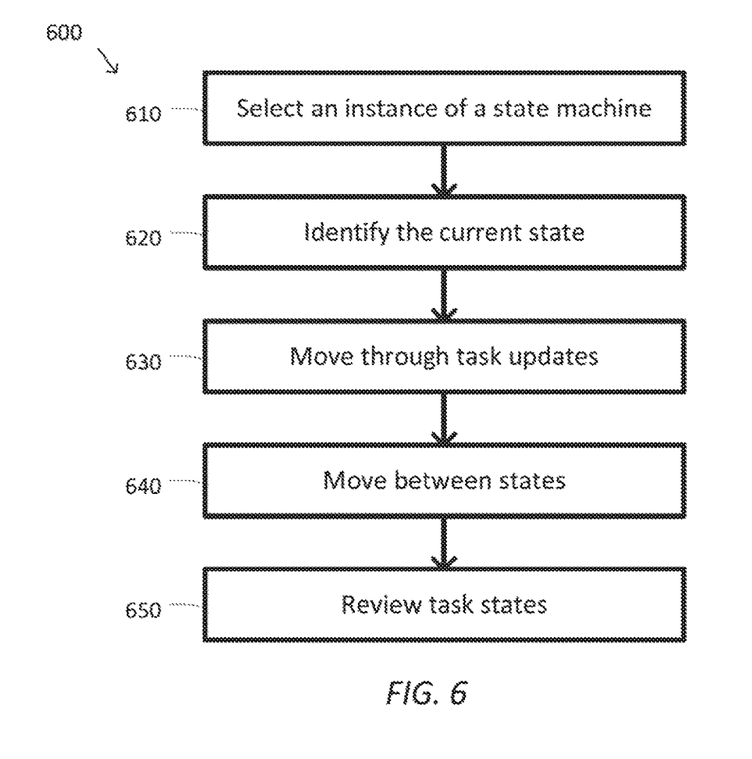
FIG. 6 is a simplified diagram of a method of tracing and/or auditing an instance of a state machine according to some embodiments.

FIG. 6 is a simplified diagram of a method 600 of tracing and/or auditing an instance of a state machine according to some embodiments. One or more of the processes 610-650 of method 600 may be implemented, at least in part, in the form of executable code stored on non-transitory, tangible, machine readable media that when run by one or more processors may cause the one or more processors to perform one or more of the processes 610-650. For example, method 600 may be implemented by a state machine engine. And although FIG. 6 implies an apparent ordering to the processes of method 600, no such strict ordering is required as users may move around between the various move and trace processes to trace and/or audit the instance of the state machine. In some examples, process 650 may be performed concurrently while the instance of the state machine and its various updates are being navigated using processes 620-640. And although processes 610-650 of method 600 are generally described below as if they are being performed by a user as an agent via, for example, a graphical user interface, each of the processes 610-650 may be alternatively performed by other agents (e.g., automated systems and/or applications) via an API call to the state machine engine.

At a process 610, an instance of a state machine is selected. The instance of the state machine to be traced and/or audited may be selected using a process similar to process 520.

At a process 620, the current state for the instance of the state machine selected during process 610 is identified. The current state of the instance of the state machine may be identified using a process similar to process 530 by, for example, finding the most recent (e.g., using the TimeStamp field) instance of a TransitionEvent that matches the identifier of the instance of the state machine selected during process 610 and referencing the ToState field of that TransitionEvent.

At a process 630, the task updates associated with possible state transitions from the current state may then be moved through. In some examples, the most recent status of each of the tasks may be determined by finding the most recent (e.g., using the TimeStamp field) instance of a TaskEvent that matches the identifier of the instance of the state machine and/or the instance of the corresponding tasks (e.g., using the TaskID and Version fields). The status of each of the tasks may then be retrieved and/or displayed using the corresponding instance of the schema and/or form. In some examples, the search for the TaskEvents may be made more efficient by searching for TaskEvents having a time stamp after the time stamp associated with the TransitionEvent used to identify the current state during process 620. The various task updates may then be traced by moving through any additional instances of TaskEvents associated with the corresponding task in reverse chronological order (e.g., to step backward through task updates) or in forward chronological order (e.g., to step forward through task updates). In some examples, the user interface may allow movement through updates for individual tasks and/or alternatively provide a timeline showing each recorded TaskEvent and allowing the user to move through the task updates across all the task updates in the order they occurred.

At a process 640, the user may move between the states to review a state transition history of the instance of the state machine. In some examples, the movement may be backward in time by using the FromState field of the TransitionEvent used to find the current state (e.g., the TransitionEvent used to find the current state during process 620). In some examples, the movement may be forward in time by identifying a TransitionEvent with a smallest time stamp from among the time stamps greater than the time stamp of the TransitionEvent used to find the current state and using the ToState field of that TransitionEvent.

At a process 650, the task states are reviewed. As the instance of the state machine is navigated between states and/or task updates using processes 620-640, the agent may access the state of the various tasks by accessing the instance of the schema that corresponds to the current point within the state machine being traced and/or audited. In some examples, the forms corresponding to the various tasks and their versions may be used to display the state to the agent.

Processes 610-650 may then be repeated in any suitable order to select instances of other state machines, move through the various state transitions and/or task updates, and/or review the task states.

It should be appreciated that the recording of each task update event (TaskEvent) and state transition event (TransitionEvent) makes tracing and auditing of instances of the state machines simple and effective. In some embodiments, the data structures and/or database tables used to record the TaskEvents and/or TransitionEvents may be organized using time interval indices. In some examples, the time interval indices may be used to more rapidly and efficiently search the TaskEvents and TransitionEvents during processes 620-640.

In should be further appreciated that use and recording of each task and versions of the tasks with tracking of this in the TaskEvents makes the state machine tracing and auditing accurate despite any changes in the task definitions, state transitions, and states. Because the actual schema and/or form associated with the version of the task applied at the time of the task update or the state transition are recorded and recoverable, the agent tracing and/or auditing the instance of the state machine is able to recover and examine the state machine as it existed at the time of the task update and/or state transition.

Figure 7:
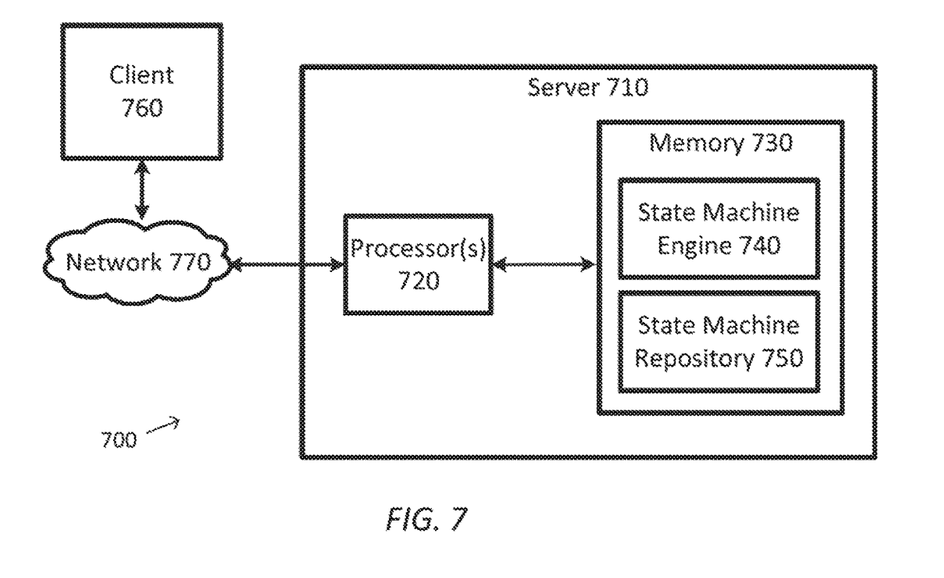
FIG. 7 is a simplified diagram of a computing system usable for state machine management according to some embodiments.

FIG. 7 is a simplified diagram of a computing system 700 usable for state machine management according to some embodiments. As shown in FIG. 7, computing system 700 is built around a client-server model; although other arrangements of the structures are possible as would be understood by one skilled in the art and/or as further described below. Computing system 700 includes a server 710 on which much of the functionality of the state machine management is performed. Server 710 includes one or more processors 720 coupled to memory 730. Operation of server 710 is controlled by the one or more processors 720. Each of the one or more processors 720 may correspond to a central processing unit, a multi-core processor, a microprocessor, a microcontroller, a digital signal processor, a field programmable gate array (FPGA), an application specific integrated circuit (ASIC), and/or the like. Server 710 may be implemented as a stand-alone system, a subsystem and/or board added to a computing device, and/or as a virtual machine.

Memory 730 may be used to store software executed by the server 710, one or more data structures, data bases, and/or the like used during operation of server 710. Memory 730 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 730 includes storage for a state machine engine 740 and a state machine repository 750. State machine engine 740 corresponds to executable software and/or the like used to implement the various processes used in creating, manipulating, tracking, tracing, auditing, and/or the like as described in further detail above with respect to methods 300-500. State machine repository 750 is used to store the various objects and/or instances used by methods 300-500 to keep track of the definitions of state machines, such as the objects defined using the object descriptions of FIG. 2 and created and/or modified using, for example, method 300. State machine repository 750 is further used to store the instances of the state machines, states, state transitions, and tasks created by method 400. In addition, state machine repository 750 is used to store the TaskEvents and TransitionEvents defined using the object descriptions of FIG. 3 and created, for example, by method 500 and traced and/or audited using, for example, method 600.

Server 710 and state machine engine 740 typically facilitate access to, manipulation, and tracing of state machines and their instances recorded and/or tracked in state machine repository 750. In some examples, state machine engine 740 may provide access to one or more agents either operating locally (e.g., one or more state machine applications operating on server 710) or operating remotely. One such remote agent may be located on client 760, which is coupled to server 710 via a network 770. Network 770 may include one or more LANs and/or WANs. Each agent may access the services of state machine engine 740 through one or more interfaces provided by state machine engine 740, such as one or more graphical user interfaces, web interfaces, one or more APIs, and/or the like.

Some embodiments of the state machine management system described herein may include non-transient, tangible, machine readable media that include executable code that when run by one or more processors may cause the one or more processors (e.g., the one or more processors 720 in server 710) to perform the processes of methods 400-600 as described above. Some common forms of machine readable media that may include the processes of methods 400-600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
loading, by a state machine engine operating on a server, an instance of a state machine, the state machine comprising a plurality of states, one or more state transitions between respective pairs of the states, and one or more tasks for each of the one or more state transitions, each of the one or more tasks representing a precondition before a corresponding state transition may occur and being identified by a respective combination of a task identifier and a task version;
identifying, by the state machine engine, a current state from among the plurality of states of the instance of the state machine;
providing, by the state machine engine to an agent, a status of a first task associated with an outgoing state transition from the current state, the task being identified by a first task identifier and a first task version;
receiving, by the state machine engine and from the agent, an update made to the status of the first task by the agent; and
recording, by the state machine engine, the update to the status of the first task as a first task event, the first task event recording the first task identifier, the first task version, a first time stamp of when the update occurred, and an identifier of the agent.

2. The method of claim 1, wherein recording the update to the status of the first task further comprises recording a schema of current data values for data fields associated with the first task.

3. The method of claim 1, further comprising:
determining, by the state machine engine, whether each required data field of the first task is assigned a value; and
providing, by the state machine engine to the agent and in response to the determining, an indication that the first task is completable.

4. The method of claim 3, further comprising validating, by the state machine engine, whether values of data fields of the first task satisfy one or more validation rules before providing the indication that the first task is completable.

5. The method of claim 1, further comprising:
determining, by the state machine engine, whether each non-skippable task of a first state transition is completable; and
providing, by the state machine engine to the agent and in response to the determining, an indication that the first state transition may be performed.

6. The method of claim 5, further comprising:
receiving, by the state machine engine from the agent, an instruction to perform the first state transition; and
recording, by the state machine engine, a transition event, the transition event recording the current state, a new state determined by the first state transition, a second time stamp of when the first state transition is performed, and the identifier of the agent.

7. The method of claim 5, further comprising recording, by the state machine engine, a second task event for a first skippable task indicating that the first skippable task was skipped.

8. The method of claim 1, further comprising:
determining, by the state machine engine, the current state of the instance of the state machine by searching a plurality of recorded transition events to identify a first transition event having a most recent time stamp; and
determining, by the state machine engine, the current state from the first transition event.

9. The method of claim 8, further comprising tracing, by the state machine engine, a history of states for the instance of the state machine based on time stamps and to and from states recorded in the transition events.

10. The method of claim 1, further comprising tracing, by the state machine engine, a history of task updates for the instance of the state machine based on time stamps recorded in task events.

11. The method of claim 1, wherein each combination of task identifiers and task versions corresponds to a task having one or more different data fields, one or more different validations, or one or more different completion conditions.

12. A non-transitory machine-readable medium comprising a plurality of machine-readable instructions which when executed by one or more processors associated with a server cause the processors to perform a method comprising:
loading an instance of a state machine, the state machine comprising a plurality of states, one or more state transitions between respective pairs of the states, and one or more tasks for each of the one or more state transitions, each of the one or more tasks representing a precondition before a corresponding state transition may occur and being identified by a respective combination of a task identifier and a task version;
identifying a current state from among the plurality of states of the instance of the state machine;
providing, to an agent, a status of a first task associated with an outgoing state transition from the current state, the task being identified by a first task identifier and a first task version;
receiving, from the agent, an update made to the status of the first task by the agent; and
recording the update to the status of the first task as a first task event, the first task event recording the first task identifier, the first task version, a first time stamp of when the update occurred, and an identifier of the agent.

13. The non-transitory machine-readable medium of claim 12, wherein the method further comprises:
determining whether each required data field of the first task is assigned a value;
validating whether values of data fields of the first task satisfy one or more validation rules; and
providing, to the agent and in response to the determining and the validation, an indication that the first task is completable.

14. The non-transitory machine-readable medium of claim 12, wherein the method further comprises:
determining whether each non-skippable task of a first state transition is completable;
providing, to the agent and in response to the determining, an indication that the first state transition may be performed; and
receiving, from the agent, an instruction to perform the first state transition;
recording a transition event, the transition event recording the current state, a new state determined by the first state transition, a second time stamp of when the first state transition is performed, and the identifier of the agent.

15. The non-transitory machine-readable medium of claim 12, wherein the method further comprises:
determining the current state of the instance of the state machine by searching a plurality of recorded transition events to identify a first transition event having a most recent time stamp; and
determining the current state from the first transition event.

16. The non-transitory machine-readable medium of claim 15, wherein the method further comprises:
tracing a history of states for the instance of the state machine based on time stamps and to and from states recorded in the transition events.

17. A computing system comprising:
a memory for storing a state machine repository storing:
one or more state machine objects describing structures of a state machine, the structures including a plurality of states, one or more state transitions between respective pairs of the states, and one or more tasks for each of the one or more state transitions, each of the one or more tasks representing a precondition before a corresponding state transition may occur and being identified by a respective combination of a task identifier and a task version; and
one or more task events describing respective updates to one of the one or more tasks, each of the one or more tasks including a respective task identifier, a respective task version, a respective time stamp of when a corresponding update occurred, and an identifier of a respective agent responsible for the corresponding update; and
one or more processors coupled to the memory, the one or more processors configured to execute instructions to cause the computing system to:
load an instance of a state machine;
identify a current state from among the plurality of states of the instance of the state machine;
provide, to an agent, a status of a first task associated with an outgoing state transition from the current state, the task being identified by a first task identifier and a first task version;
receive, from the agent, an update made to the status of the first task by the agent; and
record the update to the status of the first task as a first task event in the memory, the first task event recording the first task identifier, the first task version, a first time stamp of when the update occurred, and an identifier of the agent.

18. The computing system claim 17, wherein the one or more processors are further configured to:
    determine whether each required data field of the first task is assigned a value;
    validate whether values of data fields of the first task satisfy one or more validation rules; and
    provide, to the agent and in response to the determining and the validation, an indication that the first task is completable.

19. The computing system claim 17, wherein the one or more processors are further configured to:
    determine whether each non-skippable task of a first state transition is completable;
    provide, to the agent and in response to the determining, an indication that the first state transition may be performed;
    receive, from the agent, an instruction to perform the first state transition; and
    record a transition event, the transition event recording the current state, a new state determined by the first state transition, a second time stamp of when the first state transition is performed, and the identifier of the agent.

20. The computing system claim 17, wherein the one or more processors are further configured to:
    trace a history of states for the instance of the state machine based on time stamps and to and from states recorded in a plurality of stored transition events.

* * * * *